No. 728,809. PATENTED MAY 19, 1903.
T. SANDSTROM.
SHORT TURN WAGON GEAR.
APPLICATION FILED MAR. 10, 1903.
NO MODEL. 2 SHEETS—SHEET 1.

WITNESSES:
John T. Schrott
Louis Dieterich

INVENTOR
T. Sandstrom,
BY
Fred G. Dieterich & Co.
ATTORNEYS.

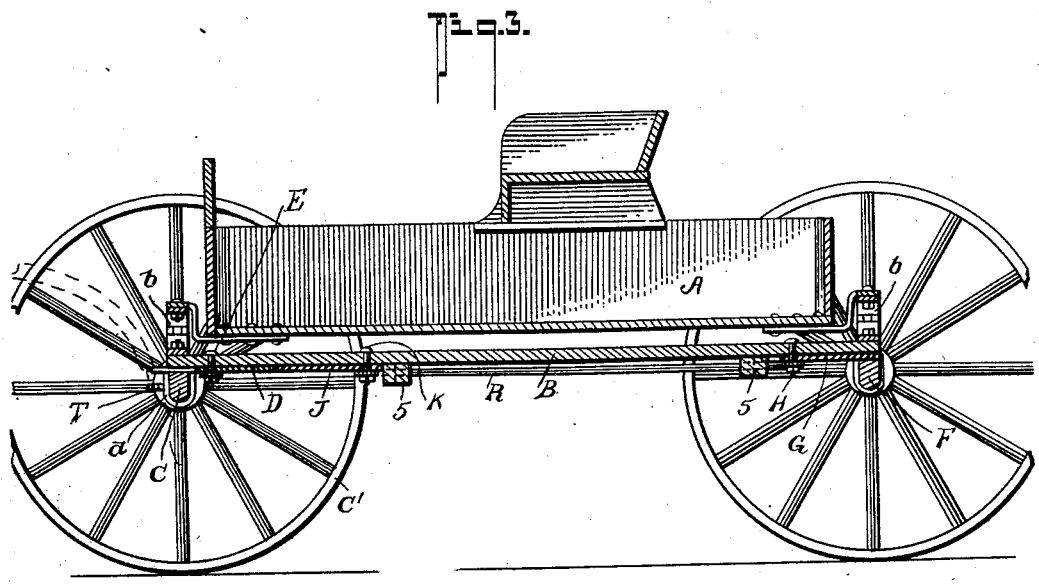
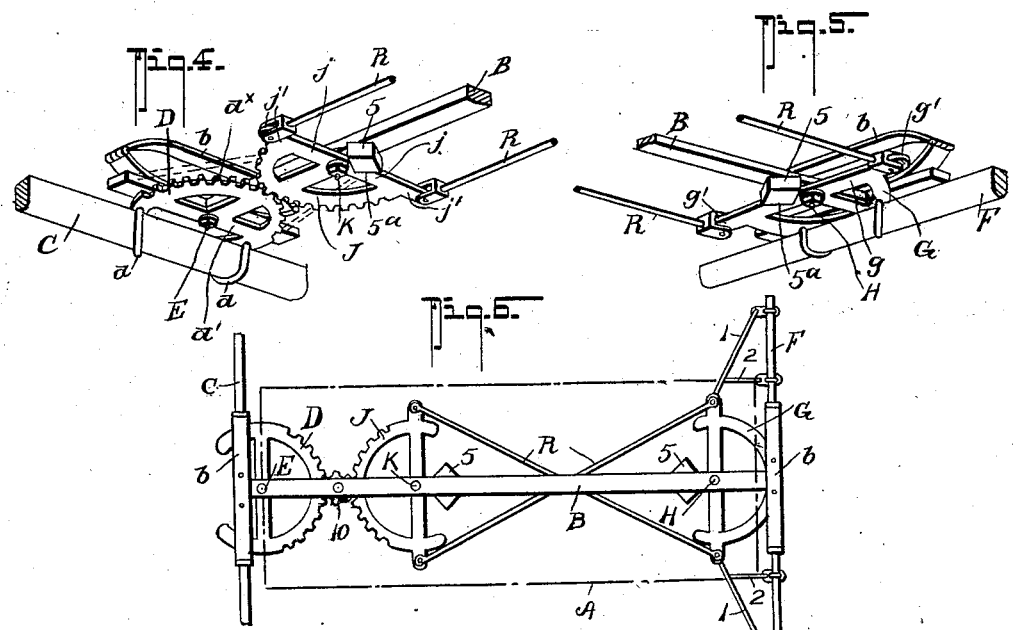

No. 728,809. Patented May 19, 1903.

UNITED STATES PATENT OFFICE.

THEODORE SANDSTROM, OF CONNERSVILLE, INDIANA, ASSIGNOR OF ONE-HALF TO CARL E. SANDSTROM, OF CONNERSVILLE, INDIANA.

SHORT-TURN WAGON-GEAR.

SPECIFICATION forming part of Letters Patent No. 728,809, dated May 19, 1903.

Application filed March 10, 1903. Serial No. 147,173. (No model.)

*To all whom it may concern:*

Be it known that I, THEODORE SANDSTROM, residing at Connersville, in the county of Fayette and State of Indiana, have invented a new and Improved Short-Turn Wagon-Gear, of which the following is a specification.

My invention relates to improvements in that form of wagon-gearing in which the front and rear axles have fifth-wheels and intermediate connections joining the said wheels, whereby a greater angle of movement of the axle within a shorter radius is obtainable than can be secured in the ordinary form of axle-gearing, which has its pivot or king-bolt connections in the vertical plane of the axles.

My invention comprehends a wagon-gearing of the character stated of a very simple and economical construction, in which is included a peculiar and coöperative arrangement of a fifth-wheel for each of the axles, link members joining one of said wheels with a supplemental fifth-wheel or gear segmentally held in mesh with the other fifth-wheel, whereby a uniform motion of like degree in opposite directions is imparted to the front and rear axles in such manner that the said mechanism may be readily attached to all kinds of delivery-wagons and light buggies and high wheels used with the vehicle-body set low, whereby to permit of a short turn, and in which the gear connections are also especially designed to allow the use of a wide body and for causing the rear wheel to always travel as far out as the front wheel and in which the body during short turning will not turn over.

In its more complete nature my invention embodies a special combination of a front and rear axle fifth-wheel and intermediate devices joining said fifth-wheels, in which is included stiff stay-rods, which connect one of the said fifth-wheels with a supplemental fifth-wheel geared direct with the other fifth-wheel, a reach and stop devices on the reach for limiting the turn movement of the axles and the fifth-wheels, whereby to prevent the carrier-wheels engaging the sides of the wagon or buggy box, and thereby dispense with the use of the usual rubbing-plates.

Again, my invention consists of certain details of construction and peculiar combination of parts, all of which will hereinafter be fully explained, and specifically pointed out in the appended claims, reference being had to the accompanying drawings, in which—

Figure 1:
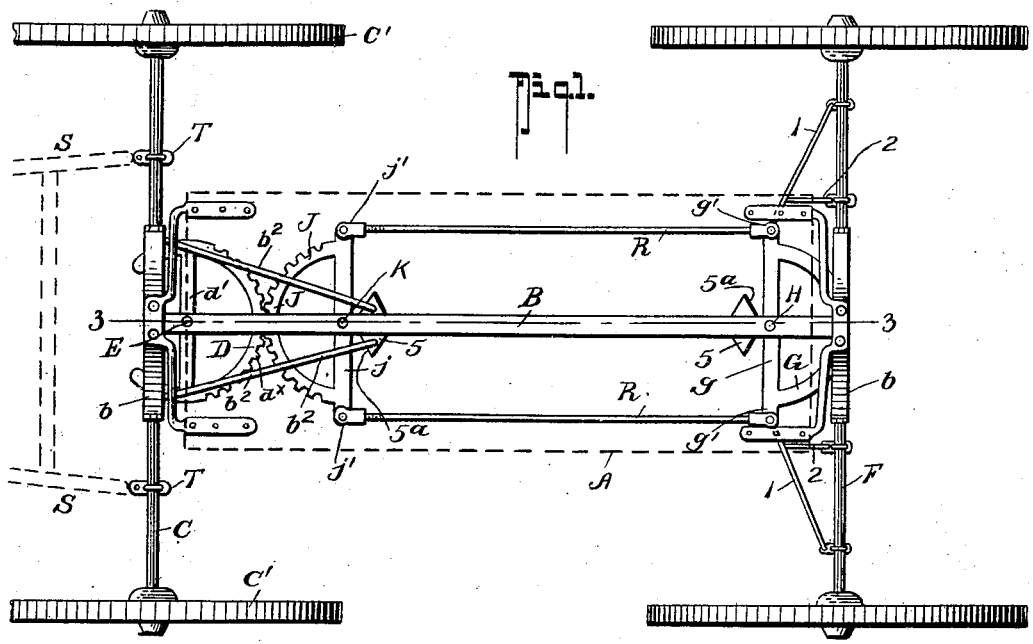
Figure 2:
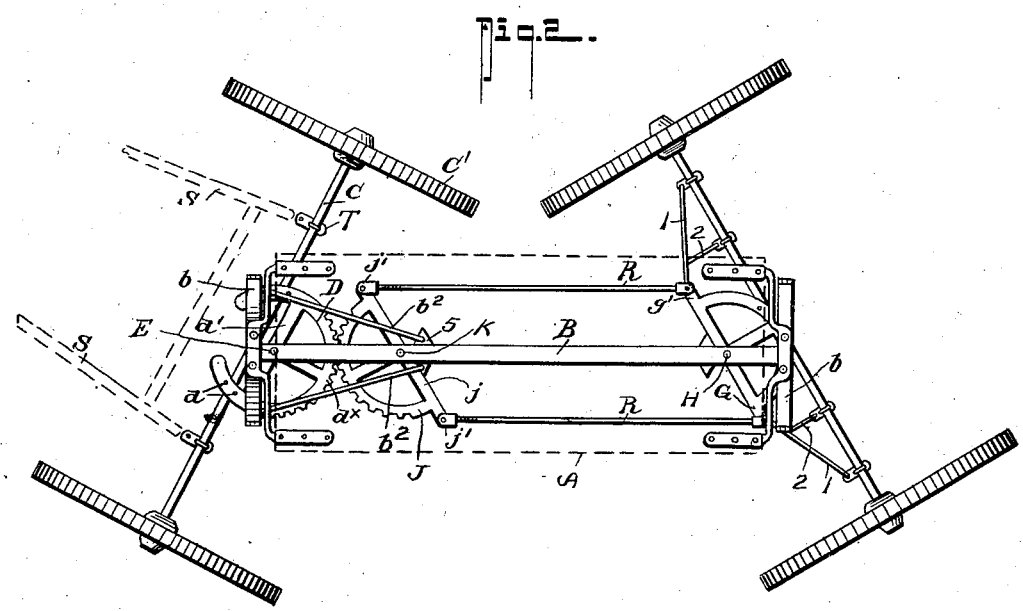

Figure 1 is a plan view of my improved wagon-gear, the axles being in their normal or parallel position. Fig. 2 is a similar view, the axles being shown in position to make a short turn. Fig. 3 is a vertical longitudinal section taken on the line 3 3 of Fig. 1. Fig. 4 is a detail perspective view of the front axle with its fifth-wheel connections. Fig. 5 is a detail view of the rear axle with its wheel connection. Fig. 6 is a plan view of a modified construction of my invention, hereinafter explained.

In carrying out my invention I mount the vehicle-body A on the reach-bar B in any well-known manner, preferably by the usual strap-springs that join with the crossed springs $b\ b$, mounted on the opposite ends of the reach-bar, as shown.

C designates the front axle, to which the shafts S S are connected by the usual thill-clips T T, as shown.

To the top of the axle C, midway the carrier-wheels $C'\ C'$, is secured a fifth-wheel D, which is connected to the axle by clips $d\ d$, and the said wheel has an axial cross-bar $d'$, with which the king-bolt E, mounted in the front end of the reach-bar B, engages, said king-bolt being disposed to the rear of the axle, as clearly shown in Fig. 1.

F designates the rear axle, to which is connected the rear fifth-wheel G, which also includes an axial cross-bar $g$, through which passes the king-bolt H, that projects down from and is supported on the rear end of the reach-bar B at a point in advance of the rear axle, as seen in Figs. 3 and 4, by reference to which it will also be noticed that the cross-bar $g$ extends beyond the peripheral edge of the body of the wheel G to produce extensions $g'\ g'$, the reason for which will presently appear, and it will also be observed from the said Figs. 3 and 4 that while the axial point of the front fifth-wheel is close up to the front axle the axis of the rear fifth-wheel is some distance in advance of the rear axle, and to provide for such relation of parts the ends of the fifth-wheels G are extended some distance forward from the said rear axle.

To avoid the use of stays (such as are commonly used for connecting the rear axle with the reach-bar) in my construction, the said axle and the fifth-wheel are braced by truss-rods 1 1, clipped at their outer ends to the axle and having their inner ends bolted to the extensions $g'$ $g'$ of the cross member $g$ of the wheel G, and the said rods 1 1 in themselves are braced by short stay members 2 2, arranged as clearly shown in Figs. 1 and 2.

The front fifth-wheel D has its peripheral edge formed with a cog-rim $d^\times$, which meshes with a supplemental fifth-wheel J, disposed in the horizontal plane of the wheel D and which is of the same diameter as the wheels D and G, and the said member J also has an axial cross-bar $j$, fulcrumed on a king-bolt K, mounted in the reach-bar B, and the said cross-bar $j$ has extensions $j'$ that oppose the extensions $g'$ $g'$ of the rear cross-bar $g$ of the member G, and the said extensions $g'$ and $j'$ are connected by the parallelly-disposed stiff rods R R, as clearly shown in Figs. 1 and 2.

The supporting-springs $b$ on the ends of the reach-bar B are braced to the said bar by stay-rods $b^2$ $b^2$, as shown.

So far as described it will be readily apparent that the turn movement of the front axle will at once be transmitted in reverse angles to the rear axle through the medium of the supplemental fifth-wheel J and the straightway or parallel stiff rods R R, that join the said supplemental wheel J with the rear fifth-wheel, and by reason of such peculiar connection of parts a gear construction is provided which has approximately double the turning capacity over the ordinary form of wagon-gear, and by reason of the parallel stiff-rod connection the rattling or loose play common in the cross-rod gear connections now in use is overcome. Again, by reason of the wide separation of the off-side carrier-wheels when turned ample room is provided as the wheels travel from the center in turning to get in and out of the wagon or buggy without rubbing against the wheels.

To prevent the wheels rubbing or engaging the sides of the vehicle-body A when making the turn, stop-locks 5 5 are firmly secured to the reach-bar, which locks have V-shaped bearing-faces $5^a$ $5^a$, with which the cross-bearings $g$ and $j$ of the members $g$ and $j$ engage, the said faces $5^a$ $5^a$ having such an angle relatively to the longitudinal axis of the wagon-body as to limit the turn of the axle in either direction to predetermined distances, thereby doing away with the necessity of placing rubbing-plates on the sides of the vehicle-body.

One of the advantages of my construction of wagon-gear is that in turning a corner fast the wagon-body will not turn over, as the weight of the person or persons in the rig is transferred to a point between the reach and the outside wheels, which causes the said wheels to brace the rig.

In Fig. 6 is illustrated a slightly-modified form of my invention in which the same general arrangement of parts shown in Figs. 1 and 2 is embodied, the differentiating features being the cross arrangement of the rods that connect the wheels J and G and an intermediate idler cog-gear 10, that meshes with the gear-rims of the fifth-wheels J and D, whereby to effect the same relative arrangement from the front to the rear axle as is transmitted from the said front axle to the rear axle in the preferred construction.

From the foregoing description, taken in connection with the drawings, it is believed the complete construction, the operation, and the advantages of my invention will readily appear.

It will be seen that the several parts are of such relative arrangement and so combined as to permit of economical manufacture and a practical assembling thereof without the aid of more than ordinary skill of a blacksmith or wheelright. The said arrangement of parts admits of using a high or low hung body, a wide or narrow body, and a short turn, and under all adjustments when turning a corner the rear wheel will travel as far out as the front wheel and will always clear any object that is cleared by the front wheel.

Having thus described my invention, what I claim, and desire to secure by Letters Patent, is—

1. In a vehicle running-gear of the character described; the combination of a reach-bar, a front and a rear axle, a fifth-wheel on each axle having a king-bolt connection on the reach-bar, a supplemental fifth-wheel mounted on the reach-bar held in the plane of the axle fifth-wheel and in direct gear connection with one of the said axle fifth-wheels, the other axle fifth-wheel and the supplemental fifth-wheel each including a transverse member having end extensions, and rigid rod members connected to the said extensions, substantially as shown and described.

2. As an improvement in vehicle running-gears; the combination with a reach-bar having means at the opposite ends for supporting the vehicle-body, a front and a rear axle, a fifth-wheel fixedly secured to each axle, a king-bolt connection for each fifth-wheel for joining the same with the opposite ends of the reach-bar, intermediate connections joining the front and rear fifth-wheels, said connections including a supplemental fifth-wheel mounted on the reach-bar and geared with one of the fifth-wheels on the reach-bar, and rigid rod connections joining the said supplemental fifth-wheel with the other reach-bar-supported fifth-wheel, as specified.

3. In a vehicle running-gear as specified; the combination with the reach-bar, the front and the rear axle, a fifth-wheel fixedly mounted on each axle and a king-bolt for each fifth-wheel mounted in the reach-bar, said fifth-wheel having transversely-disposed extensions, the front fifth-wheel having a cog-rim, an idler-gear journaled on the reach-bar held in mesh with said fifth-wheel cog-rim, a supplemental fifth-wheel mounted on the reach-bar in the horizontal plane of the idler-gear and having a cog-rim to mesh with the said idler-gear, and a rigid rod connection joining the said supplemental fifth-wheel and the fifth-wheel on the rear axle, for the purposes described.

4. A vehicle running-gear, comprising in combination with the front and the rear axles and the reach-bar; a fifth-wheel mounted on each axle, a king-bolt connection for each of said fifth-wheels mounted on the reach-bar, a supplemental fifth-wheel also mounted on the reach-bar in the horizontal plane of the other fifth-wheels, said supplemental fifth-wheel and the rear-axle fifth-wheel each including a transverse bar having end extensions, the parallelly-disposed rigid rods connected with the said extensions of the supplemental and the rear-axle fifth-wheels, and stops on the reach-bar with which the transverse bars of the supplemental rear-axle fifth-wheels engage, for the purposes described.

THEODORE SANDSTROM.

Witnesses:
 FRANK M. EDWARDS,
 FRANK E. NEVIN.